United States Patent [19]

Yanagi et al.

[11] E Patent Number: Re. 33,293

[45] Reissued Date of Patent: Aug. 7, 1990

[54] READER-PRINTER

[75] Inventors: Masaaki Yanagi, Tokyo; Satoshi Ono, Yokohama; Takao Toda; Kazuo Kashiwagi, both of Tokyo; Makoto Endo, Yokohama; Yoshihiro Saito, Tokyo, all of Japan

[73] Assignee: Canon Kabushiki Kaisha, Tokyo, Japan

[21] Appl. No.: 195,854

[22] Filed: May 19, 1988

Related U.S. Patent Documents

Reissue of:

[64] Patent No.: 4,589,767
Issued: May 20, 1986
Appl. No.: 777,028
Filed: Sep. 17, 1985

U.S. Applications:

[63] Continuation of Ser. No. 483,122, Apr. 8, 1983, abandoned.

[30] Foreign Application Priority Data

| | | | |
|---|---|---|---|
| Apr. 21, 1982 | [JP] | Japan | 57-58191[U] |
| Apr. 22, 1982 | [JP] | Japan | 57-67651 |
| Apr. 22, 1982 | [JP] | Japan | 57-67655 |
| Apr. 23, 1982 | [JP] | Japan | 57-69118 |
| Jul. 28, 1982 | [JP] | Japan | 57-72367 |

[51] Int. Cl.[5] ..... G03B 13/28

[52] U.S. Cl. ..... 355/45; 355/66; 355/68

[58] Field of Search ..... 355/5, 14 E, 44, 45, 355/68, 66, 43, 51, 65

[56] References Cited

U.S. PATENT DOCUMENTS

| | | | |
|---|---|---|---|
| 3,926,518 | 4/1975 | Berry et al. | 355/68 X |
| 4,153,364 | 5/1979 | Suzuki et al. | 355/68 X |
| 4,174,175 | 11/1979 | Di Maria | 355/44 |
| 4,200,391 | 4/1980 | Sakamoto et al. | 355/14 E |
| 4,251,153 | 2/1981 | Levine | 355/5 X |
| 4,279,497 | 7/1981 | Satomi | 355/51 X |
| 4,367,033 | 1/1983 | Watanabe | 355/45 X |

FOREIGN PATENT DOCUMENTS

| | | |
|---|---|---|
| 1125552 | 6/1982 | Canada . |
| 0021363 | 6/1980 | European Pat. Off. . |
| 42856 | 4/1975 | Japan . |
| 138740 | 12/1978 | Japan . |
| 143569 | 11/1980 | Japan . |

*Primary Examiner*—L. T. Hix
*Assistant Examiner*—D. Rutledge
*Attorney, Agent, or Firm*—Fitzpatrick, Cella, Harper & Scinto

[57] ABSTRACT

Disclosed is a reader-printer capable of being changed over between a reader mode in which the light image of an original is projected onto a screen and a printer mode in which the light image of the original is projected onto a photosensitive medium. The reader-printer has first optical means for forming a first optical path for projecting the light image onto the screen and second optical means for forming a second optical path for projecting the light image onto the photosensitive medium. The second optical means includes a first mirror and a second mirror. The first mirror is movable so that it is positioned outside the first optical path during the reader mode and is positioned in the first optical path during the printer mode. The second mirror is movable with the first mirror. When the first mirror is being moved between a first position and a second position, the light from the original is detected by light detecting means, and when the first mirror is positioned in the first optical path, the light image is reflected by the first mirror and then reflected and guided to the photosensitive medium by the second mirror.

19 Claims, 9 Drawing Sheets

READER-PRINTER

Matter enclosed in heavy brackets [ ] appears in the original patent but forms no part of this reissue specification; matter printed in italics indicates the additions made by reissue.

This is a continuation of application Ser. No. 483,122, abandoned, filed Apr. 8, 1983.

BACKGROUND OF THE INVENTION

1. Field of the Invention

This invention relates to a reader-printer changeable over between a reader mode in which the light image of an original is projected onto a screen for observation and a printer mode in which the light image of the original is projected onto a photosensitive medium by a slit exposure system and the copy image thereof is obtained.

2. Description of the Prior Art

In the reader-printer of this type, it has heretofore been practised that the reader optical path for projecting the image of an original such as a microfilm onto a screen and the printer optical path for projecting the image of the original onto a photosensitive medium are used partly in common with each other. To change over the apparatus between the reader mode and the printer mode, a change-over mirror is provided in the common optical path and by rotating this mirror, it is placed into and out of the optical path to thereby effect the change-over between the two modes. This change-over method has required a driving device for rotating the change-over mirror, and this has led to the complexity of the construction of the apparatus as well as the bulkiness of the change-over mirror which is attributable to the necessity of reflecting the entire image and thus, it has been difficult to make the apparatus compact. Further, it is difficult to accurately dispose the rotatable mirror at a predetermined angle in the common optical path and, even if such mirror is accurately disposed, frequent change-over operation may derange the disposition angle of the mirror with a result that the image cannot be accurately projected onto a predetermined position.

Also, in a reader-printer wherein the copying operation is effected by a slit exposure system, it is necessary to move a scanning member to scan the original and this leads to the necessity of providing a second driving device for moving the scanning member and thus, the conventional reader-printer has been provided with the device for driving the change-over mirror and the device for driving the scanning member. This has led to the complexity, bulkiness and expensiveness of the apparatus.

Generally, originals to be copied in a copying apparatus include those of high contrast such as printed matter and those of low contrast such as newspaper or diazo copies, and to obtain good copies, it is necessary to change the exposure amount by the exposure lamp or the bias voltage of the developing device. In such case, the density of the original is detected and the exposure amount, etc. are controlled in accordance with the detected density. The detection of the image density of the original is accomplished by detecting the light reflected by or transmitted through the whole or part of the original, and in such photometric system, when for example a document is to be copied, even if the characters on the document are of the same density, the photometric value (the quantity of light received) may differ depending on the portion which the characters occupy in the photometrically measured area (which corresponds to the light-receiving area of the light-receiving element) and thus, the quality of the detected copy image varies in conformity with the size of the photometrically measured area. To accurately detect the image density, photometry can be effected by a light-receiving element of a small light-receiving area, but in this case, it is necessary to provide a number of light-receiving elements to reliably detect the ground density of the original and the density of the images such as characters, and the increased number of light-receiving elements leads to an increased number of attendant circuits (for example, an output amplifying circuit, a photometric value detecting circuit, etc.) and accordingly complexity and expensiveness of the apparatus.

SUMMARY OF THE INVENTION

It is an object of the present invention to eliminate the above-noted disadvantages.

It is another object of the present invention to provide a reader-printer which is simple and compact in construction.

It is still another object of the present invention to provide a reader-printer which is capable of being simply and quickly changed over between a reader mode and a printer mode.

It is yet still another object of the present invention to provide a reader-printer in which the change-over operation between the reader mode and the printer mode and the scanning operation for slit exposure can be simply accomplished by a common driving means.

It is a further object of the present invention to detect the density of an original during the aforementioned change-over operation and obtain a proper copy image on the basis of the detected density.

It is still a further object of the present invention to simply detect a wide range of density of originals and obtain a proper copy image on the basis of the detected density. These objects of the present invention will become fully apparent from the following detailed description thereof taken in conjunction with the accompanying drawings.

DESCRIPTION OF THE PREFERRED EMBODIMENTS

Figure 1:
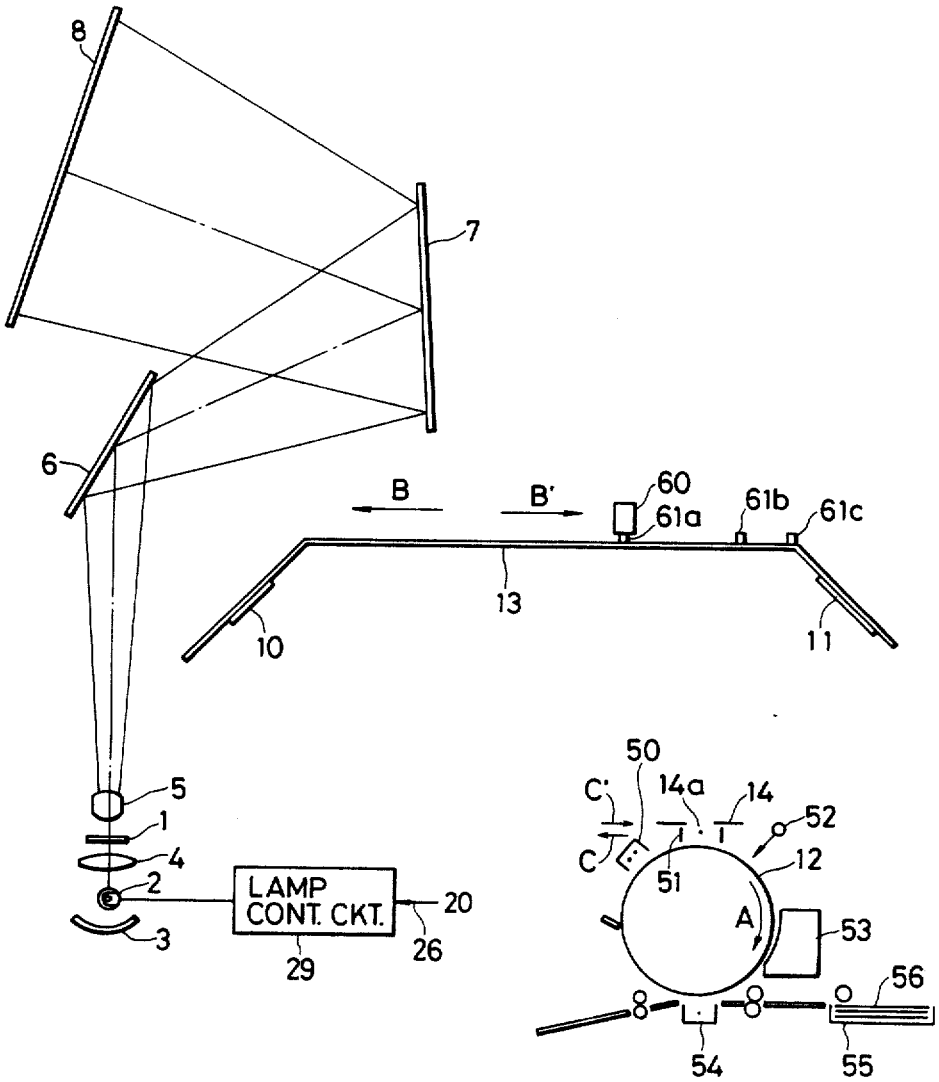
FIG. 1 schematically shows the construction of a reader-printer to which the present invention is applied.

The invention will hereinafter be described with respect to specific embodiments thereof shown in the drawings. Referring to FIG. 1 which shows a copying apparatus to which the present invention is applied, an original such as a microfilm 1 is illuminated by an illuminating device comprising an illuminating lamp 2, a spherical mirror 3 and a condenser lens 4. The entire image in one frame of the microfilm 1 is projected onto a screen 8 by a projection lens 5 via stationary mirrors 6 and 7 disposed at predetermined positions. The lens 5 and mirrors 6 and 7 together form a first optical path for projecting the images on the film 1 onto the screen 8.

Designated by 10 and 11 are scanning mirrors for scanning the image-bearing surface of the film 1 to slit-expose a photosensitive drum 12 to the optical images of the film. The reflecting surfaces of the mirrors 10 and 11 form an angle of 90°. The first and second mirrors 10 and 11 are reciprocated integrally, i.e. as a unit, in the directions of arrows B and B', and the first mirror is placed in a first optical path during the printer mode. When the first mirror 10 is placed in the first optical path, the first and second mirrors form a second optical path for projecting the images of the film onto the photosensitive drum 12. The photosensitive drum 12 is connected to a motor, not shown, and is rotated at a predetermined velocity in the direction of arrow A. The first and second mirrors 10 and 11 are fixedly supported by a support member 13 which is coupled to a drive source and is rectilinearly reciprocated in the directions of arrows B and B' while holding the scanning mirrors 10 and 11. The movement velocity of the scanning mirrors 10 and 11 is set to ½ of the peripheral velocity V of the photosensitive drum 12, this movement velocity V/2 being constant irrespective of the projection magnification. The scanning mirrors 10 and 11 each have an elongated shape which projects a slit-like area of the entire image in one frame of the microfilm onto the photosensitive drum 12. The scanning mirrors 10 and 11 are moved together in a direction across the optical path of the lens 5 (a direction perpendicular to the optical axis of the lens) in synchronism with rotation of the photosensitive drum 12, whereby the entire image in one frame of the microfilm to be copied is successively scanned and projected in a slit-like form onto the photosensitive drum 12.

When the apparatus is in the reader mode, the first and second mirrors 10 and 11 are placed at their normal position (first position) shown in FIG. 1, and when the first mirror 10 lies outside the optical path of the lens 5 (first optical path), the images of the microfilm 1 illuminated by the lamp 2 are projected onto the screen 8 via the stationary mirrors 6 and 7, whereby these images can be viewed on the screen.

Figure 2:
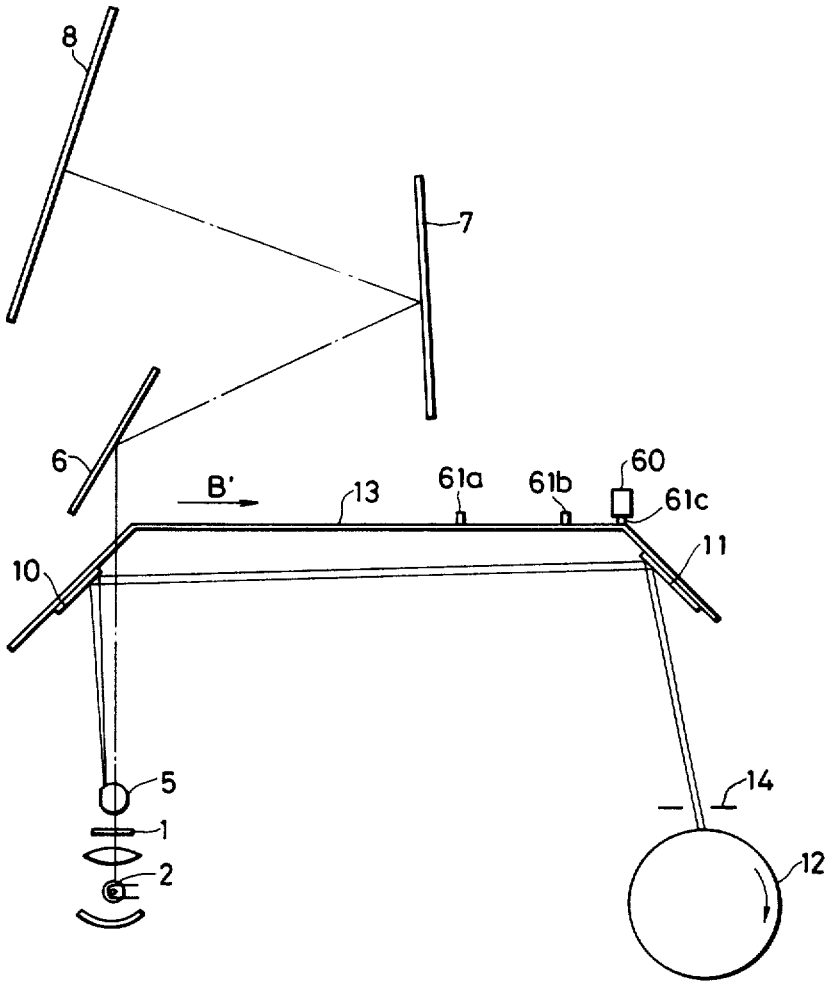
FIGS. 2 and 3 illustrate the operative condition of the reader-printer shown in FIG. 1.
Figure 3:
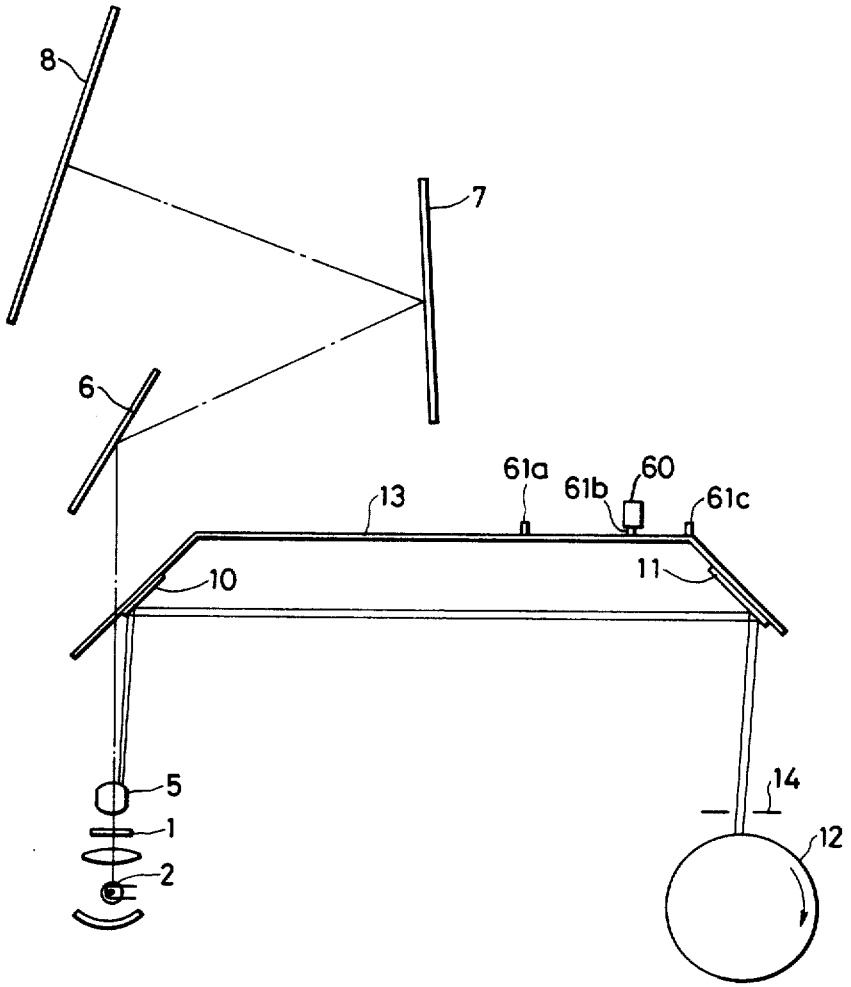

On the other hand, when the apparatus has been changed over from the reader mode to the printer mode, the support member 13 is moved in the direction of arrow B, whereby the first and second mirrors 10 and 11 are moved to their position as shown in FIG. 2 and thus, the first mirror is placed at the exposure starting position (second position) in the first optical path. When the first mirror 10 is placed at the exposure starting position, the support member 13 is moved in the opposite direction, namely, the direction of arrow B' and, during the movement thereof in the direction of arrow B', the images of the film are projected onto the photosensitive drum 12 via the first and second mirrors and a slit plate 14, whereby the images are scanned for exposure on the photosensitive drum, thus completing the exposure scanning in the condition of FIG. 3. After the completion of the image exposure, the support member 13 is continuedly moved in the direction of arrow B' and, when the first and second mirrors 10 and 11 have returned to their normal position shown in FIG. 1, the support member 13 is stopped, whereby the apparatus is automatically changed over from the printer mode to the reader mode. When it is desired to obtain a number of copies, the scanning mirrors 10 and 11 may be reciprocated between the exposure starting position and the exposure terminating position as often as required.

In the above-described embodiment, the scanning mirrors 10 and 11 are moved in the same direction, but alternatively they may be moved in different directions. Also, the scanning mirror 10 is moved in a direction perpendicular to the optical axis of the lens, but alternatively it may be moved in a different direction to scan the image.

The photosensitive drum 12 comprises a three-layer photosensitive medium comprising a conductive layer, a photoconductive layer and a transparent insulating layer laminated in the named order, and has the insulating layer on the surface thereof. This photosensitive drum is uniformly charged by a primary charger 50, and then has the primary charge removed therefrom by an AC discharger or a DC discharger 51 opposite in polarity to the primary charger 50 while being exposed to the image light from the microfilm, whereafter it is uniformly exposed to the light from a lamp 52, whereby an electrostatic latent image corresponding to the projected image pattern is formed on the surface of the photosensitive drum. The electrostatic latent image on the photosensitive drum 12 is then developed by a developing device 53, whereafter the developed image is transferred to transfer paper 56, fed from a cassette 55, by an image transfer device 54.

In FIG. 1, reference numeral 60 designates a position detector for detecting the position of the support member 13. The position detector 60 is disposed along the movement path of members 61a, 61b and 61c to be detected which are provided at predetermined locations on the support member 13. The detector 60 comprises a photoelectric conversion element and a lamp, and the members 61a–61c to be detected each comprise an opaque projection. When the support member 13 is moved, the optical path passing through the photoelectric conversion element and the lamp of the detector 60 is intercepted by the members 61a–61c to be detected and, when this optical path is intercepted, the detector 60 detects the members to be detected and puts out a signal. A shutter, not shown, is provided in a second optical path and is operable by the output signal of the detector 60.

When the apparatus is in the reader mode, the detector 60 detects the member 61a to be detected and, at this time, the first mirror 10 is in its normal position shown in FIG. 1. When the apparatus is changed over to the printer mode and the detector 60 detects the member 61c to be detected, the first mirror 10 is in the scanning starting position shown in FIG. 2, and when the detector 60 detects the member 61b to be detected, the first mirror 10 is in the scanning terminating position shown in FIG. 3.

The detector 60 controls drive means for moving the support member 13. When the apparatus has been changed over from the reader mode to the printer mode, said drive means drives to move the support member 13 in the direction of arrow B, and when the detector 60 detects the member 61c to be detected during this movement, the drive means is stopped by a signal put out from the detector 60, and then the drive means drives in the reverse direction to move the support member 13 in the direction of arrow B' and thereafter, when the detector 60 detects the member 61a to be detected, the drive means is stopped by a signal put out from the detector 60 and thus, the apparatus assumes the reader mode again. When the detector 60 detects the member 61b to be detected during the movement of the support member 13 in the direction of arrow B', the exposure of the photosensitive drum 12 is terminated.

Figure 8:
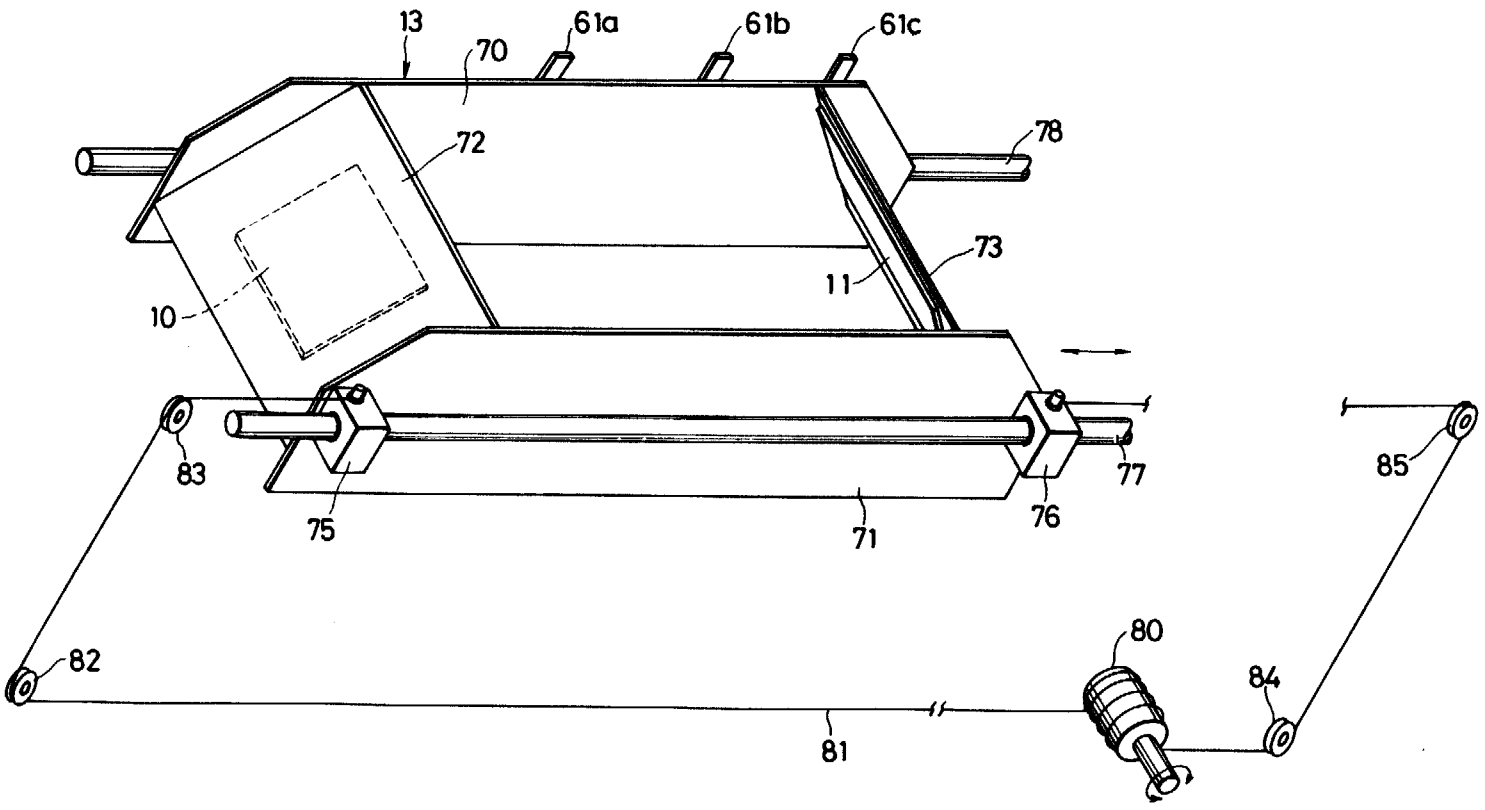
FIG. 8 is a perspective view showing a mechanism for moving scanning mirrors.

Referring now to FIG. 8 which shows a scanning mirror driving unit, the support member 13 has side plates 70 and 71 and sloping plates 72 and 73 fixed to the side plate 70. The first mirror 10 is fixed to the sloping plate 72 and the second mirror 11 is fixed to the sloping plate 73 at an angle of 90° with respect to the first mirror 10. The side plate 71 has fixed thereto slidable bearings 75 and 76 which are slidably mounted on a fixed shaft 77. Likewise, the side plate 70 has fixed thereto slidable bearings (not shown) which are slidably mounted on a fixed shaft 78. Thus, the side plates 70, 71 and sloping plates 72, 73 are reciprocally movable along the fixed shafts 77, 78 in the directions of the arrows. The intermediate portion of wire 81 is wound on a drive pulley 80 and one end of the wire 81 is wound on pulleys 82 and 83 rotatably supported on the fixed portion of the apparatus body and is secured to the bearing 75, while the other end of the wire is wound on pulleys 84 and 85 rotatably supported on the fixed portion of the apparatus body and is secured to the bearing 76.

The drive pulley 80 is connected to a motor, not shown, for rotation in forward and reverse directions and, by rotation of the drive pulley 80, the left half or the right half of the wire 81 is rolled up while the right half or the left half of the wire is rewound, whereby the support member 13 and accordingly the mirrors 10 and 11 are moved to left or right at a predetermined velocity, thus effecting the change-over between the reader mode and the printer mode as well as the scanning during the printer mode.

Figure 4:
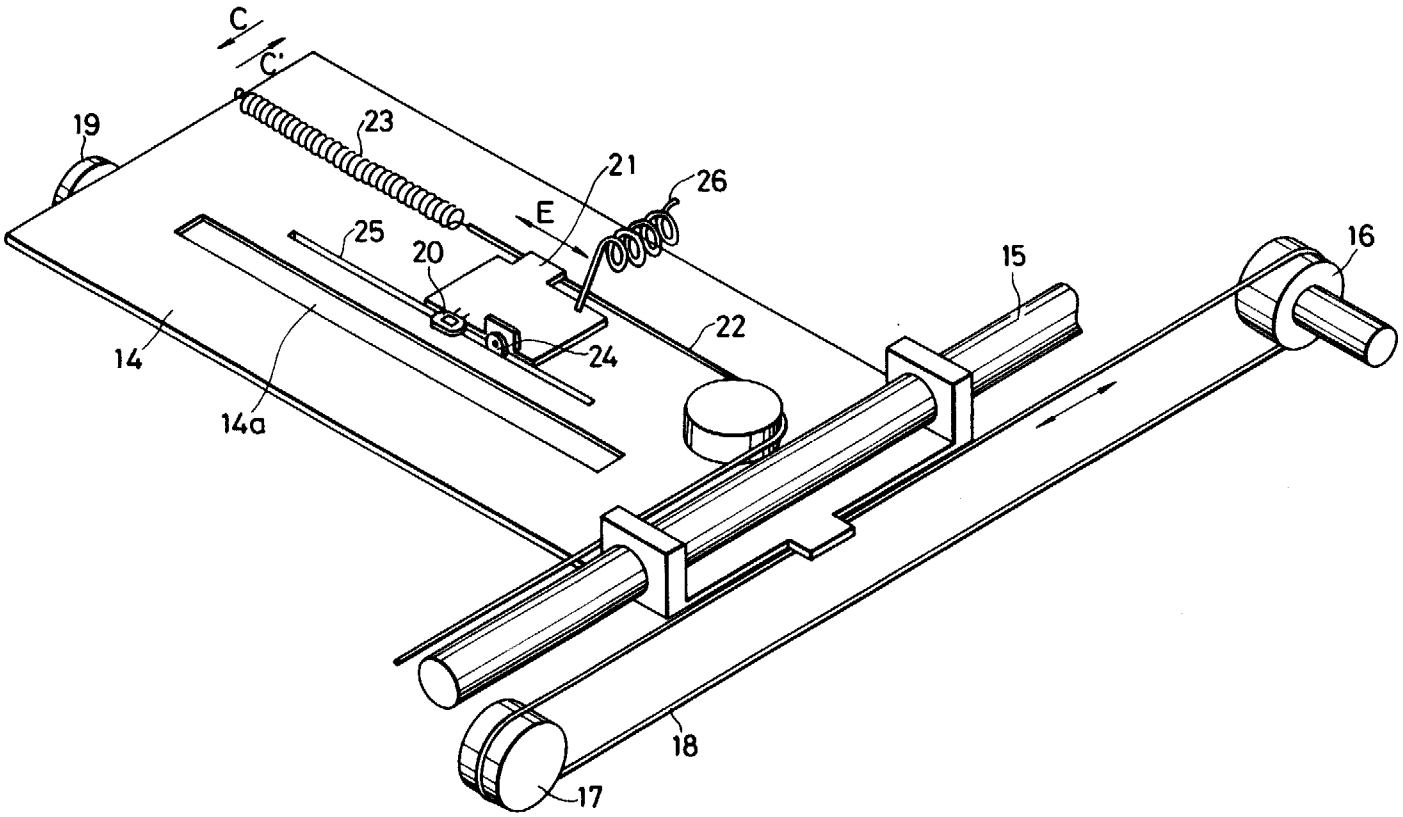
FIG. 4 is a perspective view of the slit plate.

Referring to FIG. 4 which shows a slit unit, a slit plate 14 has a slit 14a therein and is supported by a guide shaft 15 for reciprocal movement in the directions of arrows C and C', one end of the slit plate being fixed to an endless wire 18 wound on pulleys 16 and 17. A roller 19 is mounted on the other end of the slit plate 14 and movement of the slit plate may cause the roller 19 to roll on the rail (not shown) of the apparatus body. The pulley 16 is coupled to a drive source (motor) for moving the support member 13 and the slit plate 14 is designed to be moved in synchronism with movement of the scanning mirrors 10 and 11. The reason why the slit plate 14 is moved is that because the incident angle of the light ray reflected by the second mirror 11 during the printer mode and incident on the photosensitive drum 12 varies in accordance with the movement of the first and second mirrors, the slit plate is moved correspondingly to the variation in said incident angle, thereby making the quantity of light passed through the slit 14a constant irrespective of the position of the second mirror. The amount of movement of the slit plate 14 is very small as compared with the amount of movement of the scanning mirrors 10 and 11. The pulley 16 is rotatable in forward and reverse directions by the drive source and the slit plate 14 is reciprocally moved by the rotation of the pulley 16.

A light-receiving element 20 for detecting the image density of the original is disposed on a movable plate 21 which in turn is movably disposed on the slit plate 14, and it is adjacent to the slit 14a. The movable plate 21 may be moved with the light-receiving element 20 in the directions of arrow E by wire 22, whereby the light-receiving element 20 may be moved in a direction perpendicular to the original scanning direction (direction B). One end of the wire 22 is connected to a coil spring 23 fixed at one end to the slit plate 14, and the other end of the wire 22 is secured to the apparatus body, so that as the slit plate 14 is moved, the coil spring 23 expands or contracts through the intermediary of the wire 22, whereby the movable plate 21 is reciprocally moved in the directions of arrow E. A roller 24 is provided on the movable plate 21 and is loosely fitted in a groove rail 25 formed in the slit plate 14, so that movement of the movable plate 21 may cause the roller 24 to roll along the groove rail 25. The light-receiving element comprises a known photoelectric conversion element whose light-receiving area is small, and detects the quantity of light from the original. The detection signal of the light-receiving element is supplied through a flexible electric cord 26 to a lamp control circuit 29, which controls the brightness of the lamp 2 on the basis of the photometric value measured by the light-receiving element 20 so that there may be obtained an optimum exposure amount corresponding to the density of the original.

The detection of the image density by the light-receiving element takes place prior to the regular exposure step. In the present embodiment, the light-receiving element 20 receives the light from the original reflected by the mirrors 10 and 11 while these mirrors are being moved from their normal position to the exposure starting position during the change-over from the reader mode to the printer mode, and the electric power supplied to the lamp 2 is adjusted in conformity with the maximum and minimum luminous intensities of the light received by the light-receiving element 20, whereby the lamp is adjusted to an appropriate quantity of light and then the regular exposure scanning takes place. In the present embodiment, when a copy switch is closed, the lamp 2 is turned on and as the preparatory scanning, the scanning mirrors 10, 11 and slit plate 14 are moved in the direction of arrow B in synchronism with each other and thus, the apparatus is changed over from the reader mode to the printer mode. During this preparatory scanning, the light-receiving element 20 is moved in a direction perpendicular to the original scanning direction, namely, a direction parallel to the slit 14a (direction E) in synchronism with the movement of the slit plate 14, thereby photometrically scanning the original. After a predetermined range of the original has been photometrically scanned, the brightness of the lamp 2 is adjusted on the basis of the maximum and minimum of the photometric value, whereby the brightness of the lamp 2 is set to an appropriate condition corresponding to the density of the original and thereafter, the scanning mirrors 10, 11 and slit plate 14 come to assume the predetermined exposure starting position. The movement velocity of the scanning mirrors during the preparatory scanning may be made higher than the movement velocity of the mirrors 10 and 11 during the regular exposure scanning to thereby reduce the time required. Also, the quality of the copy image may be adjusted by adjusting the exposure time, the aperture, the bias voltage of the developing device, etc. on the basis of the photometric value measured by the light-receiving element. When the preparatory scanning is terminated with the mirrors 10 and 11 placed at the exposure starting position, the mirrors 10 and 11 are moved forwardly in the direction of arrow B' in synchronism with rotation of the photosensitive drum 12 and the regular exposure scanning is effected.

Figure 5:
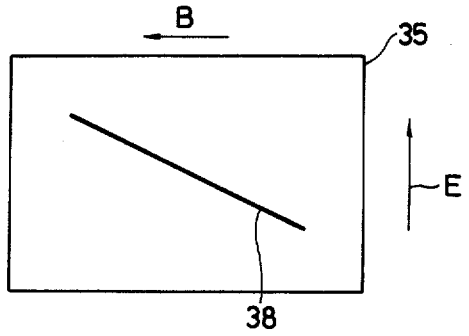
FIGS. 5, 6 and 7 illustrate the detection areas of a light-receiving element.
Figure 6:
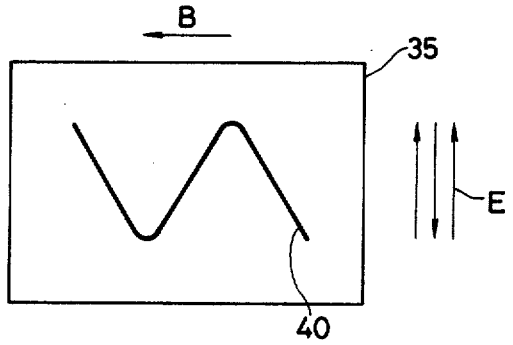

Referring now to FIG. 5 which shows the area of the original photometrically measured by the light-receiving element, reference numeral 35 designates the image of the original to be copied. When the scanning mirrors 10 and 11 scan the image 35 in the direction of arrow B and the light-receiving element 20 is moved in the direction of arrow E by an amount corresponding to the length of the arrow, the light-receiving element 20 has photometrically measured the image area indicated by a straight line 38 having a certain width. Accordingly, the light-receiving element 20 has photometrically scanned obliquely the surface of the original and thus, the densities of the character portion and the ground portion of the original can be detected accurately and reliably. Also, in FIG. 6, if the light-receiving element 20 is moved forwardly, backwardly and again forwardly as indicated by arrows E during the movement of the scanning mirrors 10 and 11 in one direction during the preparatory scanning, the light-receiving element 20 has photometrically measured the image area indicated by a curve 40 having a certain width and thus, the density of the image can be widely detected simply by the use of a single light-receiving element.

In the present invention, the number of light-receiving elements provided may be one or more.

Figure 7:
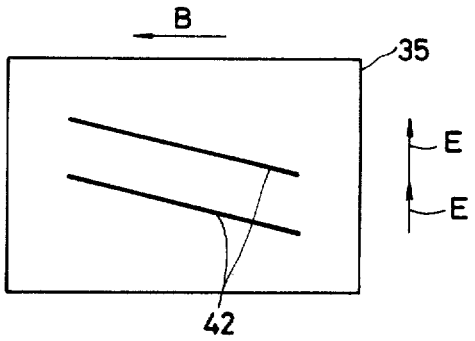

FIG. 7 shows the photometrically measured area in a case where two light-receiving elements provided in spaced apart relationship with each other in a direction perpendicular to the direction of movement of the scanning mirrors are moved forwardly in the direction of arrow E during the movement of the mirrors 10 and 11 in one direction. The image area indicated by straight lines 42 is photometrically measured by the two light-receiving elements.

In the embodiment illustrated, the light-receiving elements are moved in the direction perpendicular to the direction of movement of the scanning mirrors, but alternatively they may be moved in a direction intersecting or non-parallel to the direction of movement of the scanning mirrors.

Also, the light-receiving elements may be directly moved by a motor or the like. Further, the position at which the light-receiving elements are disposed is not restricted to the position shown in the illustrated embodiment, but such elements may also be movably disposed on the mirror 10 or 11, whereas to detect the density precisely, the elements should desirably be provided on the slit plate which is near the photosensitive drum.

Figure 9:
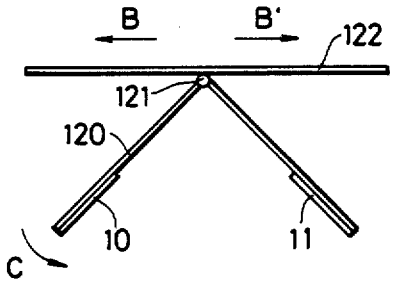
FIG. 9 shows another embodiment of the scanning mirrors.

FIG. 9 shows another embodiment of the present invention which differs from the previously described embodiment in the method of moving the scanning mirrors. The scanning mirrors 10 and 11 are provided on a carriage 120 in an orthogonal relationship with each other. The carriage 120 is supported by a support guide bar 122 for pivotal movement about an axis 121 which is coincident with the line of intersection between the mirror surfaces of the mirrors 10 and 11, and is movable in the directions of arrows B and B' along the guide bar 122.

During the reader mode, the scanning mirror 10 is positioned outside the optical path of the projection lens 5, and during the printer mode, the carriage 120 is moved in the direction of arrow B and the scanning mirror 10 is positioned in the optical path of the lens 5. After the scanning mirror 10 has been placed at the exposure starting position in the optical path, the carriage 120 is rotated in the direction of arrow C about the axis 121 while being moved in the direction of arrow B', whereby the entire image to be copied is exposure-scanned on the rotating photosensitive drum 12. In this embodiment, the scanning mirrors 10 and 11 can be made more compact. The copying system is not restricted to the embodiment illustrated, but various known copying methods are applicable. The original to be copied is not limited to microfilm, but may be a documental original. In the latter case, the reflected light from the documental original may be utilized.

According to the present invention, as described above, the apparatus can be changed over between the reader mode and the printer mode and the original can be scanned simply by moving the scanning mirrors rectilinearly so that they are placed into and out of the optical path of the projection lens and thus, the construction of the apparatus is very simple and eliminates the necessity of providing any special mirror as well as permitting the use of compact scanning mirrors which in turn leads to the compactness and inexpensiveness of the apparatus. Also, the density of the original can be widely detected by at least one light-receiving element, whereby the image density can be measured accurately with a result that copy images of high quality can always be obtained irrespective of the type of the original and the construction of the apparatus becomes simpler.

Figure 10:
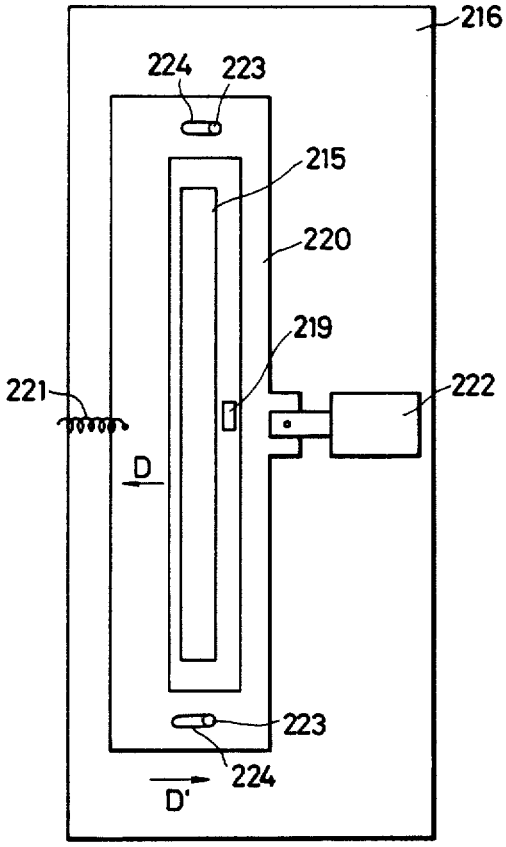
FIG. 10 is a perspective view showing another embodiment of the slit plate.

Referring now to FIG. 10 which shows another embodiment of the slit unit, reference numeral 216 designates a slit plate provided near the photosensitive drum 12. The slit plate 216 slidably holds a slit width varying plate 220 for varying the width of a slit 215. The slit width varying plate 220 is biased in the direction of arrow D by a tension spring 221 and may be moved in the direction of arrow D' by a solenoid 222. A pin 223 secured to the slit plate 216 is fitted in a slot 224 formed in the slit width varying plate 220, which is thus movable in the directions of arrows D and D' by an amount corresponding to the length of the slot 224. The solenoid 222 is driven by a signal from a microcomputer, to be described, to move the slit width varying plate 220 in the direction of arrow D', whereby the slit width varying plate 220 covers a part of the slit 215 so as to narrow the width of the slit 215 and thus reduce the quantity of light passed through the slit 215.

Figure 11:
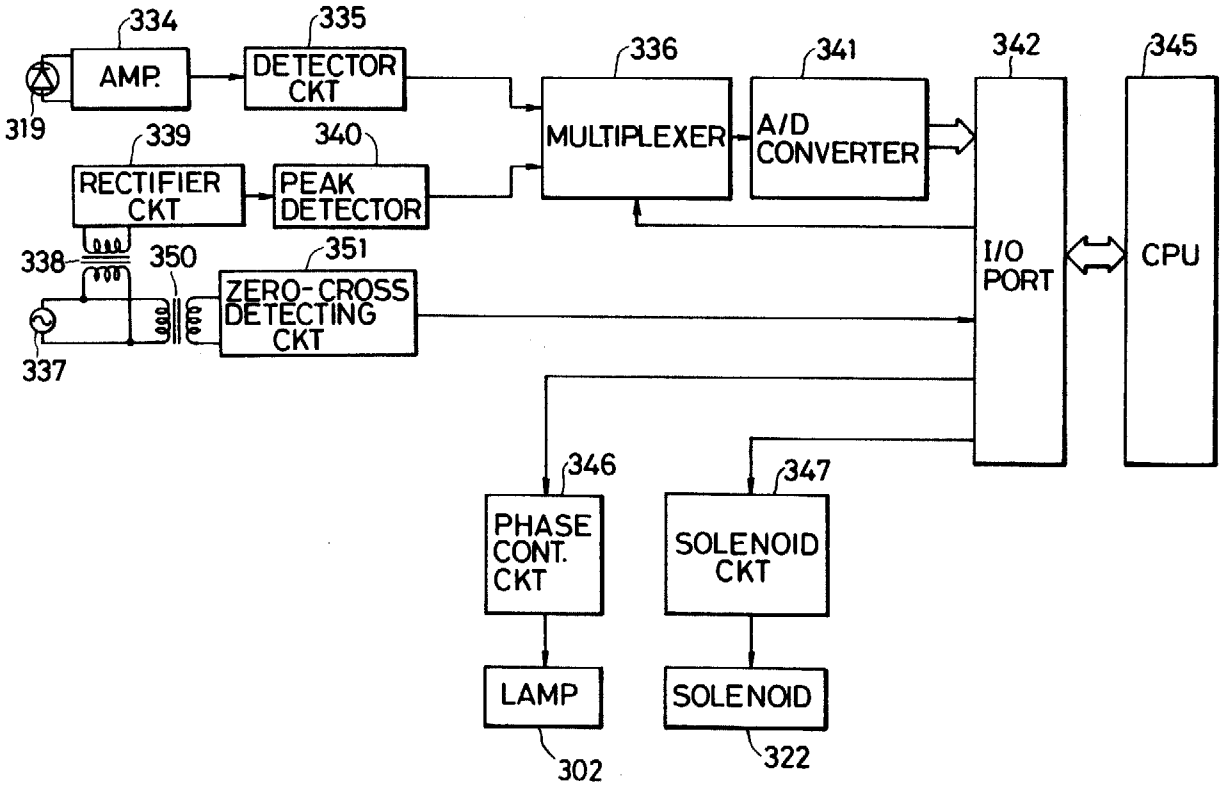
FIG. 11 is a block diagram of an exposure control circuit.

FIG. 11 shows circuitry for controlling the exposure amount by the processing of the digital signal of a microcomputer. An image density signal obtained by the light-receiving element 219 is amplified by an output amplifying circuit 334, whereafter it is applied as input to a multiplexer 336 through a photometric value detecting circuit 335. On the other hand, the voltage of a commercial AC power source (AC 100 V) 337 is reduced by a transformer 338 and the reduced voltage output (for example, AC 15 V) thereof is full-wave-rectified by a rectifier circuit 339, whereafter the peak value of the source voltage is detected and held by a peak detector circuit 340 and this peak value is applied as input to the multiplexer 336. The multiplexer 336 selects an input 1 (the photometric value of the detecting circuit 335) or an input 2 (the source voltage peak value of the detector circuit 340) and supplies it as an analog data to an A/D (analog/digital) converter circuit 341, which converts this analog data into a digital data and supplies the digital data to a CPU (central processing unit) 345 through an I/O port 342. The CPU 345 operationally processes the data of the photometric value and the source voltage peak value and supplies a signal to a phase control circuit 346 and a solenoid drive control circuit 347 to provide a proper exposure amount to the photosensitive drum 12, and controls the phase angle of the AC wave to the lamp and the width of the slit. The power supplied to the illuminating lamp 2 is phase-controlled by a bidirectional thyristor (hereinafter referred to as the triac). For the phase control by the microcomputer to be effected, the CPU 345 must discriminate the zero-cross point of the alternating current applied to the lamp 2 and for this purpose, the voltage of the AC power source 337 is reduced by a transformer 350 and the reduced voltage output (for example, AC 10 V) thereof is waveform-shaped by a zero-cross detecting circuit 351, is transformed into a signal capable of discriminating the zero-cross point in the CPU 345 and is applied as input to the CPU 345 through the I/O port 342.

Figure 12:
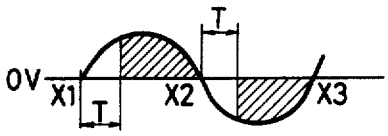
FIG. 12 illustrates the phase control system.

Reference is now had to FIG. 12 to describe the basic concept of the phase control using the microcomputer used in the present invention. The zero-cross points ($X_1$, $X_2$, $X_3$, . . . ) of the alternating current (AC 100 V) applied to the lamp 2 are discriminated in the CPU 345 by the waveform applied from the detecting circuit 351 to the CPU 345 and at this point of time, a timer is set in the CPU 345 and the time-up signal of the timer is put out from the I/O port 342, and in the phase control circuit 346, the triac is rendered conductive by this signal, whereby the phase control of each half wave of the alternating current is carried out. The set time T of the timer which determines the conduction angle of the triac is controlled by the photometric value of the photometric value detecting circuit 335 and the peak value of the peak detector circuit 340, whereby the actually effective power applied to the lamp 2 is increased or decreased.

Figure 13:
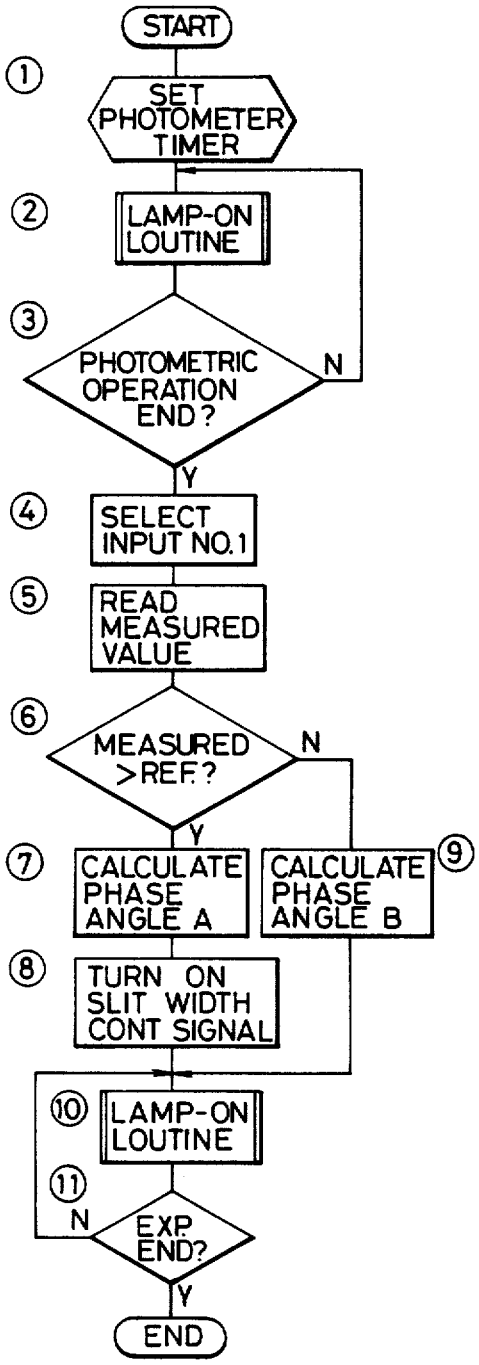
FIGS. 13 and 14 are flow charts of the program for carrying out the present invention.
Figure 14:
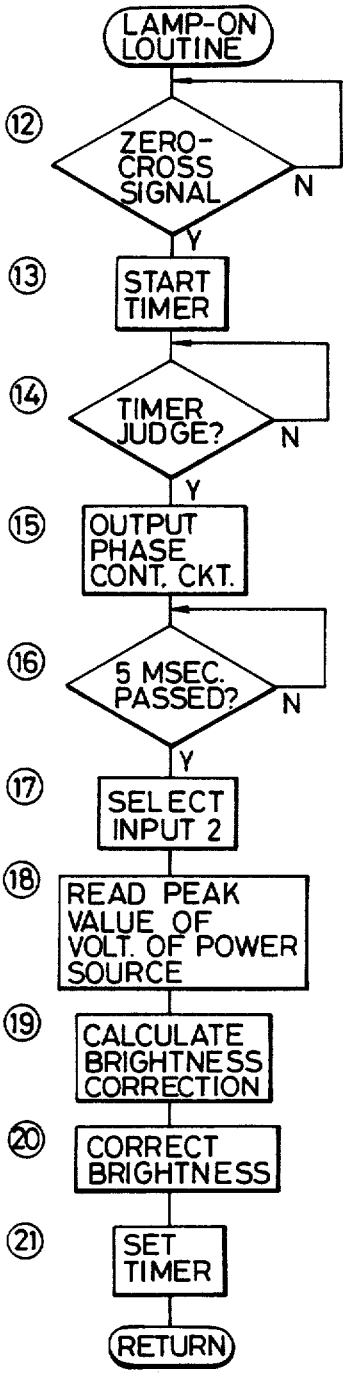

The details of the exposure amount control system will now be described by reference to the flow charts of FIGS. 13 and 14. First, at step 1, the timer for photometry is set to effect phase control so that the lamp 2 is turned on with a standard brightness for photometry (which is set to 60% of the 100% brightness when the lamp is used at the rated voltage), and at the lamp-on routine of step 2, the lamp 2 is turned on with the standard brightness. At this time, the width of the slit 215 is preset to a predetermined condition during photometry. At the lamp-on routine, the lamp 2 is turned on at a phase determined during the set time of the timer for photometry while the fluctuation of the power source is being corrected as will later be described. While the lamp 2 is turned on at this lamp-on routine, the mirrors 10 and 11 are moved to scan the original and the original is photometrically measured by the light-receiving element 219 and, at step 3, when the photometry has been terminated, the lamp 2 is turned off by a photometric operation end signal from a sequence control microcomputer (not shown). At step 4, by the signal from the CPU 345, the input 1 is selected in the multiplexer 336 and the photometric value from the light-receiving element 219 is supplied to the A/D converter 341, and at step 5, the photometric value is introduced as a digital data into the CPU 345 through the A/D converter circuit. At step 6, the digital-converted photometric value is compared with a reference value and if the measured value is greater, the program proceeds to steps 7 and 8 whereat a first phase angle corresponding to the photometric value is calculated, or if the measured value is smaller, the program proceeds to step 9 whereat a second phase angle corresponding to the photometric value is calculated. Step 6 is such that whether flicker of the lamp or density irregularity of the copy image appears with the conduction angle of the triac reduced when only the phase angle is controlled on the basis of the photometric value so that an appropriate lamp brightness is provided is discriminated by comparing the photometric value with the reference value and when the conduction angle must be reduced, the processing of steps 7 and 8 is carried out and the exposure amount is appropriately controlled by adjusting the phase angle and the slit width but without reducing the conduction angle and in the other cases, the processing of step 9 is carried out and the exposure amount is appropriately controlled by adjusting the phase alone. The reference value is suitably preset by experiment. The CPU 345 stores in the memory therein the relation among the photometric value (the density of the original), the proper lamp brightness and the set time of the phase controlling timer, and solves this relation on the basis of the photometric value and sets the phase controlling timer to the set time corresponding to the solved value, and puts out a phase control pulse when the set time is up, to thereby control the phase of the alternating current supplied to the lamp. At steps 7 and 9, the phase angle in each photometric value is calculated and the phase controlling timer is set to obtain the proper lamp brightness. When the photometric value is greater than the reference value, at step 7, the timer is set to a set time determined by the combination with the slit width correspondingly to the photometric value and at step 8, a solenoid driving signal for narrowing the slit width is delivered from the CPU 345, and at the lamp-on routine of step 10, the lamp 2 is turned on through the phase control circuit 346 by the phase control pulse put out from the CPU 345 and further, the solenoid 222 is energized through the solenoid driving circuit 347 to narrow the width of the slit 215. Thus, an appropriate exposure amount corresponding to the density of the original is provided to the photosensitive drum 12, the lamp 2 can be used in an appropriate range of brightness and flicker of the lamp or density irregularity of copy image does not occur. On the other hand, when the photometric value is smaller than the reference value, at step 9, the timer is set to the set time corresponding to the photmetric value and the slit 215 is rendered open, and at the lamp-on routine of step 10, and by the phase control pulse from the CPU 345, the lamp 2 is turned on at a phase angle determined by the set time of the timer. At step 11, when the exposure termination signal is input from the sequence controlling microcomputer at the end of the exposure, the main routine is terminated.

Description will now be made of the lamp-on routine of FIG. 14. First, at step 12, a zero-cross signal is waited for and when the zero-cross signal is input from the zero-cross detecting circuit 351, the timer is started at step 13. At steps 14 and 15, a phase control pulse is put out to the phase control circuit 346 as soon as the time is up, whereby the lamp is turned on at the set phase angle. At step 16, in case of 50 Hz, whether 5 msec. has elapsed from the inputting of the zero-cross signal is discriminated and in case of 60 Hz, whether 4.2 msec. has elapsed from the inputting of the zero-cross signal is discriminated. This is for the purpose of inputting the held source voltage peak value within the ¼ cycle after the peak. At steps 17 and 18, a signal is supplied to the multiplexer 336 and the input 2 (source voltage peak value) is selected while, at the same time, the source voltage peak value is introduced as a digital data into the CPU 345 through the A/D converter circuit 341. At steps 19 and 20, the magnitude of the conduction angle is corrected on the basis of the source voltage peak value so that the brightness of the lamp is not varied even by a fluctuation of the power source. Thus, at step 21, the corrected timer is newly set and steps 12–21 are repeated until the photometric operation or the exposure is terminated. The calculation of the amount of correction at step 19 is effected with the relation between the source voltage peak value and the amount of correction stored in the memory within the CPU 345. While, in the aforedescribed embodiment, the slit width has been varied by only one step, design may also be made such that the slit width can be varied by a plurality of steps and the slit width and the phase control conduction angle are combined to control the exposure amount or continuously vary the slit width and the slit width and the phase angle are associated with each other to control the exposure amount.

As described above, by controlling the electric power supplied to the lamp and the stop in combination, the necessity of using the lamp in its flickering condition is eliminated, whereby copy images free of density irregularity can be obtained. Also, the lamp can be used in its optimum condition and therefore, the original can be illuminated by stable brightness and moreover, the life of the lamp can be lengthened. Further, the exposure amount can be greatly controlled correspondingly to great variations in the density of the original and the copying magnification and particularly, where the original used is a microfilm, the apparatus is used with the copying magnification greatly changed and in such case, a proper exposure amount can be obtained by utilizing the stop without greatly changing the electric power supplied to the lamp, and the exposure amount can be greatly varied for a great fluctuation of the copying magnification.

While, in the above-described embodiment, phase control is carried out digitally by a microcomputer, the phase may also be controlled analogously. Also, instead of varying the slit width as the system for controlling the stop, the stop may be provided between the lamp and the original and the quantity of light passed through this stop may be varied.

What is claimed is:

1. A reader-printer in which the image of an original is selectively projected onto a photosensitive medium or a screen, said reader-printer comprising:

illumination means for illuminating the original;

optical means forming a first optical path for projecting the image of the original which is illuminated by said illumination means onto the screen when said reader-printer is operated in reader mode, and for forming a second optical path for projecting said image onto the photosensitive medium when said reader-printer is operated in printer mode, said optical means comprising a reflecting member for reflecting the light from the original;

driving means for moving said reflecting member, said driving means moving said reflecting member to an exposure starting position in the printer mode and thereafter moving it from said exposure starting position to an exposure ending position in order to perform slit exposure;

illumination control means for controlling said illumination means from the start of a change from the reader mode to the printer mode, to the start of the exposure of the image onto the photosensitive medium, while causing said illumination means to illuminate the original with a constant quantity of light;

photo-detecting means for detecting the light from the original when the original is illuminated with the constant quantity of light in accordance with said illumination control means; and printer control means for controlling the operation of said reader-printer on the basis of an output from said photo-detecting means while causing said reader-printer to form the proper image on the photosensitive medium.

2. A reader-printer according to claim 1, wherein said reflecting member is moved by said driving means to the exposure starting position in the change of mode from the reader mode to the printer mode, and from said exposure starting position to said exposure ending position in the operation of said reader-printer.

3. A reader-printer according to claim 2, wherein said illumination control means causes said illumination means to illuminate the original before the movement of said reflecting member starts from said exposure starting position after the change of mode to the printer mode.

4. A reader-printer according to claim 1, wherein said reflecting member is disposed out of said first optical path in the reader mode and in said first optical path in the printer mode.

5. A reader-printer according to claim 1, wherein said photo-detecting means detects the light from the original which is reflected by said reflecting member and moves in a direction perpendicular to the moving direction of said reflecting member during the movement of said reflecting member.

6. A reader-printer according to claim 1, wherein said printer control means controls said illumination means on the basis of an output of said photo-detecting means during the movement of said reflecting member to said exposure ending position.

7. A reader-printer according to claim 1, wherein the image of the original is projected on said photo-detecting means by the movement of said reflecting member in the printer mode.

8. A reader-printer according to claim 1, wherein said photo-detecting means is disposed near said second optical path and detects the light from the original reflected by said second mirror.

9. A reader-printer according to claim 1, wherein said printer control means controls the bias voltage of development means.

10. A reader-printer according to claim 1, wherein said printer control means controls the light intensity of the exposure which is projected onto the photosensitive medium.

11. A reader-printer capable of being changed over between a reader mode in which the image on a screen is observed and a printer mode in which the image is reproduced, said reader-printer comprising:

a projection lens for [selectively imaging the] *projecting an* image of [an] *the* original on the screen or a photosensitive medium;

[reflecting means statically located on a first position in the reader mode, and moved in a direction across the optical axis of said projection lens in the printer mode in order to scan the original;

a photosensitive medium receiving the light reflected on said reflecting means and moving with a constant speed;]

*first reflecting means opposed to said projection lens and forming a reader optical path for guiding projection light through said projection lens to the screen;*

*second reflecting means being movable into or out of an optical path between said projection lens and said first reflecting means, said second reflecting means, in the reader mode, being placed in a first position which is out of the optical path between said projection lens and said first reflecting means, and in the printer mode, being located in a second position which is in the optical path between said projection lens and said first reflecting means, said second reflecting means when located in the second position forming a printer optical path for guiding the projected light through said projection lens to the photosensitive medium;* driving means moving said *second* reflecting means [in], said [direction, said] driving means first moving said *second* reflecting means toward [a] *the* second position and thereafter moving [it] *said second reflecting means* from the second position to [a third] *the first* position in the printer mode [, and the image being exposed on the photosensitive medium firing the movement of said reflecting means from the second position to the third position];

at least one light receiving element [on which the light from the original is not projected in the reader mode, and on which the light is projected by the movement of said reflecting means from the first to] *for detecting the projection light through said projection lens, said at least one light receiving element being arranged in a position where said at least one light receiving element receives light, only when said second reflecting means in located in* the second position; and control means for [controlling the operation of said reader-printer on the basis of an output of light receiving element so that the proper reproduction image is formed] *effecting control so that said at least one light receiving element may detect the projection light during the movement of said second reflecting means from the first position to the second position and so that a proper image may be formed on the photosensitive medium by a signal output from said at least one light receiving element during the movement of said second reflecting means from the second position to the first position.*

12. A reader-printer according to claim 11, wherein said control means controls the light intensity of the exposure which is projected onto the photosensitive medium.

13. A reader-printer according to claim 11, further comprising a development means, and wherein said control means controls the bias voltage of said development means.

14. A reader-printer according to claim 11, wherein said light receiving element is moved in a direction intersecting the moving direction of said *second* reflecting means during the movement of said *first* reflecting means.

15. A slit exposure type copying apparatus in which the image of an original is projected onto a photosensitive medium so that the photosensitive medium is exposed, said apparatus comprising:

a projection lens;

a first mirror moving in a direction across the optical axis of said projection lens, for reflecting the light from said projection lens;

a second mirror located on the reflection optical path of said first mirror and moving in conjunction with said first mirror, for reflecting the light from said first mirror toward the photosensitive medium; and a slit member located between said second mirror and the photosensitive medium and moving in a direction parallel with the moving direction of said second mirror, wherein the size of the slit remains unchanged during movement of the slit member.

16. A copying machine according to claim 15, wherein said first and second mirrors are disposed so that their reflection surfaces are perpendicular to each other, and are moved as a unit.

17. A copying machine according to claim 15, wherein said slit member is moved in conjunction with said mirrors, keeping the width of the slit constant.

[18. A slit exposure type copying apparatus in which the image of an original is projected onto a photosensitive medium so that the photosensitive medium is exposed, said apparatus comprising:

a scanning optical system for scanning an original;

driving means for moving said scanning optical system;

at least one light receiving element disposed on the optical path of said scanning optical system for receiving the light from the original;

means for moving said light receiving element in a direction perpendicular to the scanning direction of said scanning optical system while causing said light receiving element to turn its moving direction at least once while said scanning optical system is scanning the original, wherein said light receiving element detects the density of an image; and control means for controlling said apparatus on the basis of an output of said light receiving element so that a proper image is formed on the photosensitive medium.]

[19. A copying machine according to claim 18, wherein said light receiving element is moved in conjunction with said scanning optical system.]

[20. A copying machine according to claim 18, wherein said scanning optical system is moved forward and backward, and wherein the image is exposed onto the photosensitive medium during the forward movement of said scanning optical system and the light from the original is detected by said light receiving element during the backward movement of said scanning optical system.]

[21. A copying machine according to claim 20, wherein said control means is controlled on the basis of an output of said light receiving element during the backward movement of said scanning optical system.]

[22. A copying machine according to claim 18, wherein said light receiving element is moved in said scanning direction while being moved in a direction perpendicular to said scanning direction.]

[23. A copying machine according to claim 22, further comprising a member on which said light receiving element is disposed, wherein said member is moved in a direction parallel to said scanning direction, and is moved in said perpendicular direction during the movement of said member in a direction parallel to said scanning direction.]

[24. A copying machine according to claim 18, wherein said light receiving element is disposed on said slit plate.]

[25. A slit exposure type copying apparatus in which the image of an original is projected onto a photosensitive medium so that the photosensitive medium is exposed, said apparatus comprising:

a scanning optical system for scanning an original;

driving means for moving said scanning optical system;

at least one light receiving element for receiving the light from the original;

movable supporting means for supporting said light receiving element wherein said supporting means moves in a direction parallel to the moving direction of said scanning optical system;

means for moving said light receiving element in a direction perpendicular to the moving direction of said supporting means while causing said light receiving element to turn its moving direction at least once during the movement of said supporting means, wherein said light receiving element detects the density of an image; and control means for controlling said copying apparatus on the basis of an output of said light receiving element so that the proper image is formed on the photosensitive medium.]

26. A reader-printer capable of being changed over between a reader mode in which an image of an original is projected onto a screen and a printer mode in which the image is projected onto a photosensitive medium, comprising:

illumination means for illuminating the original;

[reflecting means statically located in the reader mode, and moved in a direction across the optical axis of a projection lens in the printer mode in order to expose the image onto the photosensitive medium by scanning so as to reflect the light from the original toward the photosensitive medium; and]

*a projection lens;*

*a first mirror for forming a reader optical path guiding a projection light through said projection lens onto the screen;*

*a second mirror displaceable in a direction across the optical path of said projection lens, said second mirror being movable in between said projection lens and said first mirror and out therefrom;*

*a third mirror displaceable in the same direction as said second mirror and arranged at a predetermined angle with respect to said second mirror, said second and third mirrors forming a printer optical path guiding the projection light through said projection lens to the photosensitive medium;*

*driving means for moving said second and third mirrors between a receded position and a scanning starting position in the printer mode;* at least one light receiving element [for receiving the light from the original to control the light intensity of the illumination means on the basis of the received light amount, said reflecting means being moved in said direction in the printer mode before the image is projected onto the photosensitive medium, so as to form an optical path for projecting the image onto said light receiving element.] *arranged in a position in which, when said second mirror has been moved in the optical path between said projection lens and said first mirror, the projection light through said projection lens can be detected; and*

*control means for detecting the projection light by said at least one light receiving element during the movement of said second and third mirrors from the receded positions to said respective scanning starting positions, and controlling said illumination means during the movement of said second and third mirrors from their respective scanning starting positions to their receded positions, on the basis of the signal output from said at least one light receiving element, the image of the original being exposed to the photosensitive medium during the movement of said second and third mirrors from their respective scanning starting positions to their receded positions.*

27. A reader-printer capable of being changed over between a reader mode in which an image of an original is projected onto a screen and a printer mode in which the image is projected onto a photosensitive medium, and is developed by development means which utilizes a developing bias voltage comprising:

illumination means for illuminating the original;

[reflecting means statically located in the reader mode, and moved in a direction across the optical axis of a projection lens in the printer mode in order to expose the image onto the photosensitive medium by scanning so as to reflect the light from the original toward the photosensitive medium; and]

*a projection lens;*

*a first mirror for forming a reader optical path guiding a projection light through said projection lens onto the screen;*

*a second mirror displaceable in a direction across the optical path of said projection lens, said second mirror being movable in between said projection lens and said first mirror and out therefrom;*

*a third mirror movable in the same direction as said second mirror and disposed at a predetermined angle with respect to said second mirror, said second and third mirrors forming a printer optical path guiding the projection light through said projection lens to the photosensitive medium;*

*driving means for moving said second and third mirrors between a receded position and a scanning starting position in the printer mode;* at least one light receiving element *arranged in a position in which, when said second mirror has been moved in the optical path between said projection lens and said first mirror, the projection light through said projection lens can be detected; and*

[for receiving the light from the original to control the development bias voltage of the development means, on the basis of the received light amount, said reflecting means being moved in said direction in the printer mode before the image is projected onto the photosensitive medium, so as to form an optical path for projecting the image onto said light receiving element] *control means for detecting the projection light by said at least one light receiving element during the movement of said second and third mirrors from the receded positions to the respective scanning starting positions, and controlling the developing bias voltage during the movement of said*

*second and third mirrors from the scanning starting positions to the receded positions, on the basis of a signal output from said at least one light receiving element, the image of the original being exposed to the photosensitive medium during the movement of said second and third mirrors from the scanning starting positions to the receded positions.*

* * * * *

UNITED STATES PATENT AND TRADEMARK OFFICE

CERTIFICATE OF CORRECTION

PATENT NO. : Re. 33,293

DATED : August 7, 1990

INVENTOR(S) : MASAAKI YANAGI, ET AL.

It is certified that error appears in the above-identified patent and that said Letters Patent is hereby corrected as shown below: Title page:

IN [30] FOREIGN APPLICATION PRIORITY DATA

"Jul. 28, 1982 [JP] Japan" should read --Apr. 28, 1982 [JP] Japan--.

IN [56] REFERENCES CITED

FOREIGN PATENT DOCUMENTS, "0021363 6/1980" should read --0021363 1/1981--.

COLUMN 8

Line 58, "light-receiving element 219" should read --light-receiving element 319--.

COLUMN 10

Line 54, "photmetric" should read --photometric--.

Signed and Sealed this

Eighteenth Day of August, 1992

*Attest:*

DOUGLAS B. COMER

*Attesting Officer*

*Acting Commissioner of Patents and Trademarks*